US012565033B2

(12) United States Patent
Kim et al.

(10) Patent No.: US 12,565,033 B2
(45) Date of Patent: Mar. 3, 2026

(54) CERAMIC MATRIX COMPOSITE SANDWICH STRUCTURE REINFORCED WITH Z-TOWS

(71) Applicant: Raytheon Technologies Corporation, Farmington, CT (US)

(72) Inventors: Russell Kim, Temecula, CA (US); Jamshid Kavosi, Dana Point, CA (US); James T. Roach, Vernon, CT (US)

(73) Assignee: RTX Corporation, Farmington, CT (US)

( * ) Notice: Subject to any disclaimer, the term of this patent is extended or adjusted under 35 U.S.C. 154(b) by 258 days.

(21) Appl. No.: 18/196,592

(22) Filed: May 12, 2023

(65) Prior Publication Data

US 2024/0375394 A1 Nov. 14, 2024

(51) Int. Cl.
| | |
|---|---|
| *B32B 37/24* | (2006.01) |
| *B32B 3/04* | (2006.01) |
| *B32B 3/12* | (2006.01) |
| *B32B 7/09* | (2019.01) |
| *B32B 9/00* | (2006.01) |
| *B32B 9/04* | (2006.01) |
| *B32B 38/00* | (2006.01) |
| *B33Y 10/00* | (2015.01) |

(Continued)

(52) U.S. Cl.
CPC .............. *B32B 37/24* (2013.01); *B32B 3/04* (2013.01); *B32B 3/12* (2013.01); *B32B 7/09* (2019.01); *B32B 9/005* (2013.01); *B32B 9/04* (2013.01); *B32B 38/00* (2013.01); *C04B 35/565* (2013.01); *C04B 35/80* (2013.01); *B32B 2038/008* (2013.01); *B32B 2315/02*

(2013.01); *B33Y 10/00* (2014.12); *B33Y 80/00* (2014.12); *C04B 2235/5256* (2013.01); *C04B 2235/94* (2013.01)

(58) Field of Classification Search
CPC .... B32B 3/04; B32B 3/12; B32B 5/06; B32B 7/05; B32B 7/09; B32B 9/04; B32B 9/00; B32B 9/005; B32B 2038/008; B32B 18/00; C04B 35/80; C04B 35/565; C04B 35/571; C04B 35/573; C04B 2235/5256; C04B 2235/94; F01D 5/282; F01D 5/284; F05D 2300/21; F05D 2300/6033
See application file for complete search history.

(56) References Cited

U.S. PATENT DOCUMENTS

| | | | |
|---|---|---|---|
| 6,197,424 B1 * | 3/2001 | Morrison | ................ C04B 38/08 |
| | | | 416/241 B |
| 6,431,837 B1 | 8/2002 | Velicki | |

(Continued)

FOREIGN PATENT DOCUMENTS

| | | |
|---|---|---|
| CA | 2898155 C | 3/2021 |
| WO | 2022266445 A1 | 12/2022 |
| WO | 2022266446 A1 | 12/2022 |

OTHER PUBLICATIONS

Extended European Search Report for EP Application No. 24175263.3, dated Nov. 19, 2024, 9 pages.

*Primary Examiner* — Catherine A. Simone
(74) *Attorney, Agent, or Firm* — Kinney & Lange, P.A.

(57) ABSTRACT

A method of reinforcing a ceramic sandwich structure includes forming a ceramic core, assembling the sandwich structure by disposing the core between and in physical contact with a first panel and a second panel, and weaving a plurality of z-fibers at least partially through a thickness of the sandwich structure.

18 Claims, 4 Drawing Sheets

(51) Int. Cl.
  B33Y 80/00 (2015.01)
  C04B 35/565 (2006.01)
  C04B 35/80 (2006.01)

(56) References Cited

U.S. PATENT DOCUMENTS

| | | | |
|---|---|---|---|
| 6,645,333 B2 | | 11/2003 | Johnson et al. |
| 7,600,978 B2 * | | 10/2009 | Vance .................... F01D 5/147 |
| | | | 416/241 B |
| 7,993,477 B2 | | 8/2011 | Hethcock et al. |
| 8,312,827 B1 | | 11/2012 | Free |

* cited by examiner

CERAMIC MATRIX COMPOSITE SANDWICH STRUCTURE REINFORCED WITH Z-TOWS

BACKGROUND

The present invention relates to ceramic matrix composites (CMCs), and more particularly to the construction of reinforced CMC structures.

Construction of typical sandwich structures can involve forming butt joints between the core and the outer panels. Such structures rely solely on the ceramic matrix to hold the core and outer panels together, and may therefore be weakly bonded. Accordingly, more robustly constructed sandwich structures are desirable.

SUMMARY

A method of reinforcing a ceramic sandwich structure includes forming a ceramic core, assembling the sandwich structure by disposing the core between and in physical contact with a first panel and a second panel, and weaving a plurality of z-fibers at least partially through a thickness of the sandwich structure.

A ceramic matrix composite includes a reinforced sandwich structure including a first panel, a second panel, a ceramic core disposed between and in physical contact with the first panel and the second panel, and a plurality of z-fibers woven at least partially through a thickness of the sandwich structure. The ceramic matrix composite further includes a ceramic matrix enveloping the reinforced sandwich structure.

Figure 1:
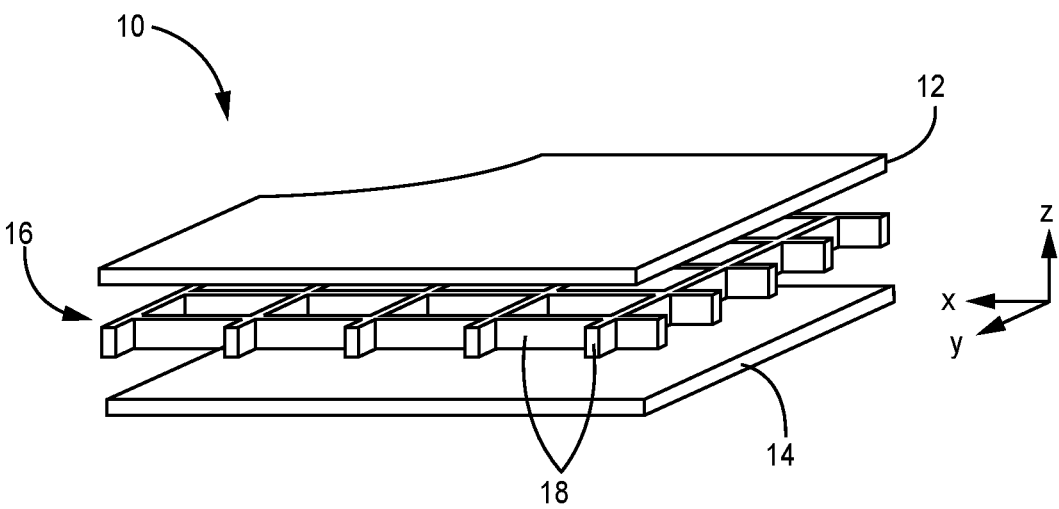
FIG. 1 is an exploded perspective view of one embodiment of a CMC sandwich structure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a reinforced CMC sandwich structure. More specifically, the bond between the outer panels and core can be reinforced by weaving z-fibers through the sandwich structure. After densification, the resulting sandwich structure has improved mechanical properties, stiffness, and load-carrying capability over non-reinforced sandwich structures, without adding significant additional weight. Such sandwich structures can be incorporated into a gas turbine engine as, for example, a platform for a blade or vane.

FIG. 1 is an exploded perspective view of CMC sandwich structure 10 including first (i.e., upper) panel 12, second (i.e., lower) panel 14, and core 16 disposed therebetween. First panel 12 and second panel 14 can each be formed from one or more layers of a ceramic (e.g., silicon carbide—SiC) fabric in a woven architecture such as plain, harness (e.g., 3, 5, 8, etc.), twill, braid, tape layup, or non-symmetric to name a few non-limiting examples. Non-woven architectures (e.g., chopped, felted, etc.) are also contemplated herein. The fabric can further be dry, stabilized, or a pre-preg material. Core 16 can be a ceramic material structure formed of ceramic strips 18 arranged, in one embodiment, to form butt joints (shown and labeled in FIGS. 2A and 2B) with first panel 12 and second panel 14. The arrangement of ceramic strips 18 is such that they form pockets/voids (labeled in FIGS. 2A and 2B). Core 16 can be formed, for example, by trimming/cutting ceramic fabric into strips 18, by machining a desired pattern into a monolithic ceramic, or by 3D printing of a preceramic polymer (e.g., a liquid ceramic precursor such as StarPCS™ SMP-10).

Core 16 can be formed/arranged on first panel 12, then second panel disposed over core 16 opposite first panel 12, or vice versa. First panel 12 and second panel 14 can alternatively be disposed/draped over an assembled core 16. When first panel 12 and second panel 14 are brought into physical contact with core 16, the state of sandwich panel 10 can be referred to as "assembled," albeit not yet reinforced in the manner discussed in greater detail below. Sandwich structure 10 can be temporarily stabilized in the assembled state by applying a binder at or around the butt joints. Such binders can include solutions of polyvinyl alcohol (PVA) or polyvinyl butyral (PVB). In an assembled state, sandwich structure 10 has an area defined by the x-y plane, and a thickness along the z-axis.

Figure 2A:
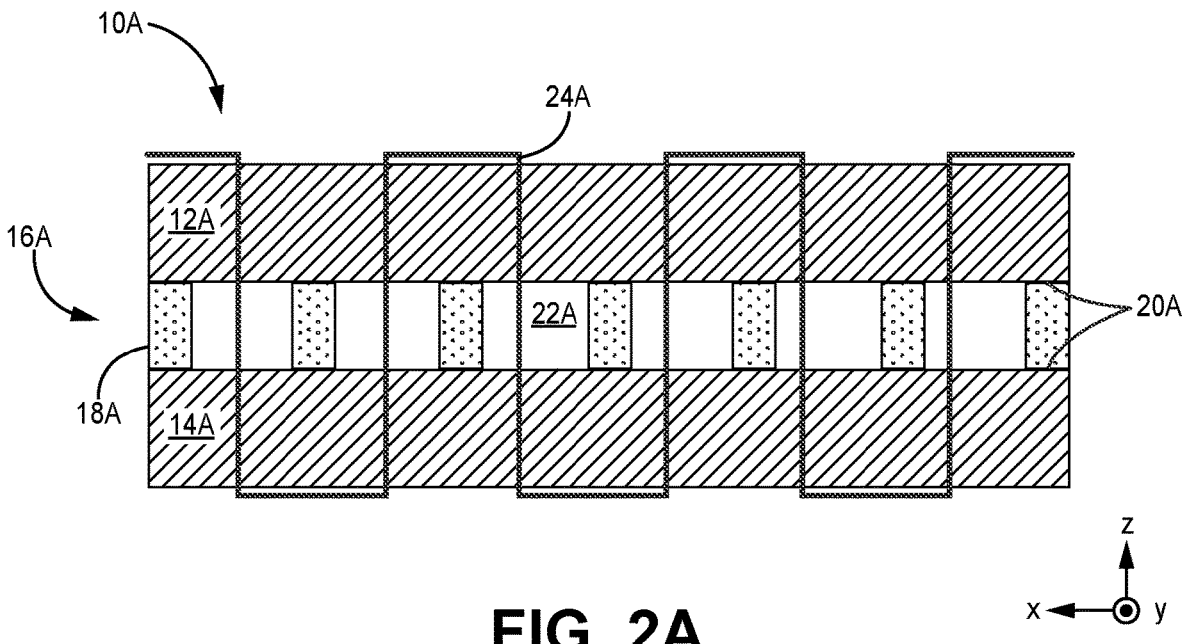
FIG. 2A is a simplified cross-sectional illustration of one embodiment of the CMC sandwich structure of FIG. 1, with a first z-fiber reinforcement pattern.
Figure 2B:
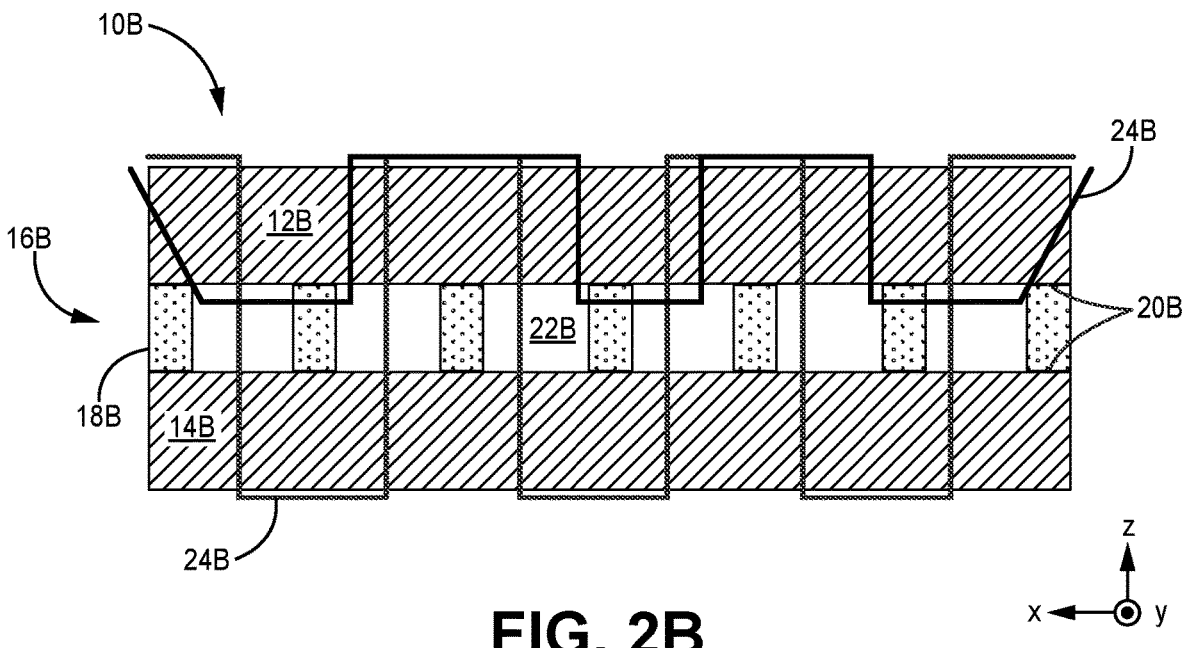
FIG. 2B is a simplified cross-sectional illustration of an alternative embodiment of the CMC sandwich structure of FIG. 1, with a second z-fiber reinforcement pattern.
Figure 2C:
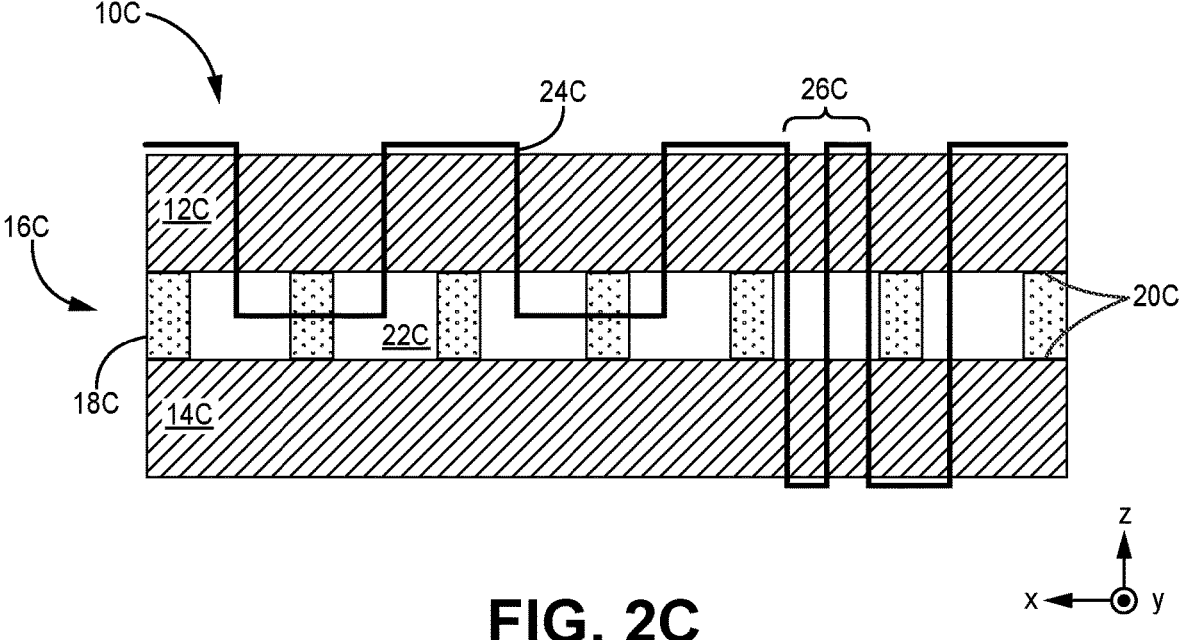
FIG. 2C is a simplified cross-sectional illustration of another alternative embodiment of the CMC sandwich structure of FIG. 1, with third z-fiber reinforcement pattern.

One or more ceramic (e.g., SiC) z-fibers/z-tows can be woven through sandwich structure 10 for reinforcement. FIGS. 2A, 2B, and 2C are simplified cross-sectional illustrations of sandwich structures 10A, 10B, and 10C, respectively, showing alternative z-fiber reinforcement patterns. Sandwich structures 10A, 10B, and 10C are substantially similar to sandwich structure 10, having respective cores 16A, 16B, and 16C of ceramic strips 18A, 18B, and 18C forming butt joints 20A, 20B, and 20C against first panels 12A, 12B, and 12C and second panels 14A, 14B, and 14C. Voids 22A, 22B, and 22C are disposed between adjacent strips 18A, 18B, and 18C.

In FIG. 2A, sandwich structure 10A is shown in a first example of a reinforced state, with z-fiber 24A woven repeatedly (i.e., in a serpentine pattern) through the entire thickness of sandwich structure 10A, interconnecting first panel 12A and second panel 14A. More specifically, z-fiber 24A can be woven through (i.e., physically contacting) the ceramic fabric of first panel 12A and second panel 14A, but extends through voids 22A of core 16A. Z-fiber 24A secures first panel 12A to second panel 14A, and core 16A therebetween. If woven blindly, that is, in the assembled state when voids 22A are not visible, guide marks can be placed on first panel 12A and/or second panel 14A during assembly to facilitate weaving. Z-fiber 24A need not extend through every void 22A, and can instead skip any desired number of voids 22A in an alternative embodiment. Although referred to as a "z-fiber." it should be noted that portions of z-fiber 24A also extend laterally with respect to the z-axis (i.e., along the x-axis) due to the serpentine weave pattern.

In FIG. 2B sandwich structure 10B is shown in a second example of a reinforced state, with a first z-fiber 24B woven repeatedly (i.e., in a serpentine pattern) through the entire thickness of sandwich structure 10B, and a second z-fiber 24B is woven repeatedly (i.e., in a serpentine pattern) through first panel 12B and strips 18B of core 16B. That is, the second z-fiber 24B extends only partially through the thickness of sandwich structure 10B. As such, the first z-fiber 24B secures first panel 12B to second panel 14B, and core 16B therebetween, while the second z-fiber 24B secures core 16B directly to first panel 12B. The second z-fiber 24B can be woven through first panel 12B and core 16B prior to the attachment of second panel 14B so that core 16B is sufficiently exposed for weaving. The first z-fiber 24B can be incorporated into sandwich structure 10B once second panel 14B is in place. The first z-fiber 24B need not extend through every void 22B, and the second z-fiber 24B need not skip segments 18B, as shown. Further, instead of extending completely through the thickness of sandwich structure 10B, the first z-fiber 24B can secure second panel 14B to core 16B. Guide markings can be used to weave z-fibers 24B into sandwich structure 10B. Further, each z-fiber 24B includes portions extending laterally from the z-axis, as was described above with respect to z-fiber 24A.

In FIG. 2C, sandwich structure 10C is shown in a third example of a reinforced state, with z-fiber 24C woven repeatedly (i.e., in a serpentine pattern) but unevenly through the thickness of sandwich structure 10C. More specifically, z-fiber 24C extends only through first panel 12C and select segments 18C of core 16C in some regions, then through the entire thickness of sandwich structure 10C in others. Sandwich structure 10C also includes locally reinforced region 26C, which in the embodiment shown, is the region between two adjacent segments 18C of core 16C. Region 26C can be considered locally reinforced because z-fiber 24C crosses between first panel 12C and second panel 14C with greater frequency than at other portions of sandwich structure 10C. Such locally reinforced regions can be desirable where sandwich structure 10C is subjected to uneven stresses. Z-fiber 24C need not extend through every void 22C, as shown. Guide markings can be used to weave z-fibers 24C into sandwich structure 10C. Further, z-fiber 24B includes portions extending laterally from the z-axis, as was described above with respect to z-fibers 24A and 24B.

With respect to reinforced sandwich structures 10A, 10B, and 10C, z-fibers 24A, 24B, and 24C (referred to collectively as "z-fibers 24") need not intersect other z-fibers 24 or extend in the same direction as other z-fibers 24 in a given sandwich structure. The implementation of z-fibers 24 is highly customizable for various sandwich structure 10 thicknesses and areas, and core 16 designs.

After sandwich structure 10 is in a reinforced state, it can undergo matrix formation and densification using a chemical vapor infiltration (CVI) process to form a CMC component. During densification, the fibrous layers of sandwich structure 10 are infiltrated by reactant vapors, and a gaseous precursor deposits on the ceramic fibers. The matrix material can be SiC or other suitable ceramic material. Densification is carried out until the resulting CMC has reached the desired residual porosity. Typically, one or several interface coatings (e.g., of boron nitride—BN) are deposited prior to the matrix to ensure that the composite fails in a non-brittle manner. In an alternative embodiment, densification can include additional and/or alternative methodologies such as, but not limited to, melt infiltration (MI) and polymer infiltration and pyrolysis (PIP).

A CMC component formed with the disclosed reinforced sandwich structures can be incorporated into aerospace, maritime, or industrial equipment, to name a few, non-limiting examples.

Discussion of Possible Embodiments

The following are non-exclusive descriptions of possible embodiments of the present invention.

A method of reinforcing a ceramic sandwich structure includes forming a ceramic core, assembling the sandwich structure by disposing the core between and in physical contact with a first panel and a second panel, and weaving a plurality of z-fibers at least partially through a thickness of the sandwich structure.

The method of the preceding paragraph can optionally include, additionally and/or alternatively, any one or more of the following features, configurations and/or additional components:

In the above method, forming the ceramic core can include forming a pattern of strips and voids by disposing a first plurality of ceramic strips in parallel, and disposing a second plurality of ceramic strips orthogonal to the first plurality of ceramic strips, machining the voids into a monolithic ceramic material, and 3D printing a first amount of a preceramic polymer into parallel first strips, and 3D printing a second amount of the preceramic polymer into second strips orthogonal the first strips.

In any of the above methods, assembling the sandwich structure can include forming a plurality of butt joints between the ceramic strips and each of the first panel and the second panel.

In any of the above methods, at least one of the plurality of z-fibers can physically contact each of the first panel and the second panel, extending entirely through the thickness of the sandwich structure in a serpentine pattern.

In any of the above methods, at least one of the plurality of z-fibers can physically contact the first panel and at least one strip of the core, extending partially through the thickness of the sandwich structure in a serpentine pattern.

In any of the above methods, the second one of the plurality of z-fibers can extend through a subset of the voids of the ceramic core.

In any of the above methods, each of the first panel and the second panel can include silicon carbide.

In any of the above methods, each of the plurality of z-fibers can include silicon carbide.

A method of forming a ceramic matrix composite can include densifying the sandwich structure formed from any of the above methods with a ceramic matrix using at least one of chemical vapor infiltration, polymer infiltration and pyrolysis, and melt infiltration.

A ceramic matrix composite includes a reinforced sandwich structure including a first panel, a second panel, a ceramic core disposed between and in physical contact with the first panel and the second panel, and a plurality of z-fibers woven at least partially through a thickness of the sandwich structure. The ceramic matrix composite further includes a ceramic matrix enveloping the reinforced sandwich structure.

The ceramic matrix composite of the preceding paragraph can optionally include, additionally and/or alternatively, any one or more of the following features, configurations and/or additional components:

In the above ceramic matrix composite, the ceramic matrix comprises silicon carbide.

In any of the above ceramic matrix composites, each of the first panel and the second panel can include silicon carbide.

In any of the above ceramic matrix composites, the core can have a grid-like pattern with a plurality of strips defining a plurality of voids.

In any of the above ceramic matrix composites, the plurality of ceramic strips can form a plurality of butt joints with each of the first panel and the second panel.

In any of the above ceramic matrix composites, at least one of the plurality of z-fibers can physically contact each of the first panel and the second panel, extending entirely through the thickness of the sandwich structure.

In any of the above ceramic matrix composites, the at least one of the plurality of z-fibers can extend in a serpentine manner along two orthogonal axes of the sandwich structure.

In any of the above ceramic matrix composites, a first of the plurality of z-fibers can physically contact the first panel and at least one strip of the core, extending partially through the thickness of the sandwich structure.

In any of the above ceramic matrix composites, a second one of the plurality of z-fibers can physically contact each of the first panel and the second panel, extending entirely through the thickness of the sandwich structure.

In any of the above ceramic matrix composites, the first and second ones of the plurality of z-fibers each extend in a serpentine manner along two orthogonal axes of the sandwich structure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of reinforcing a ceramic sandwich structure, the method comprising:
   forming a ceramic core, the ceramic core comprising a plurality of voids extending entirely through the ceramic core;
   assembling the sandwich structure by disposing the core between and in physical contact with a first panel and a second panel such that the plurality of voids extend from the first panel to the second panel; and
   weaving a plurality of z-fibers at least partially through a thickness of the sandwich structure;
   wherein at least one of the plurality of z-fibers physically contacts each of the first panel and the second panel, extending entirely through the thickness of the sandwich structure and at least one of the plurality of voids.

2. The method of claim 1, wherein forming the ceramic core comprises forming a pattern of strips and voids by:
   disposing a first plurality of ceramic strips in parallel, and disposing a second plurality of ceramic strips orthogonal to the first plurality of ceramic strips;
   machining the voids into a monolithic ceramic material; or 3D printing a first amount of a preceramic polymer into parallel first strips, and 3D printing a second amount of the preceramic polymer into second strips orthogonal the first strips.

3. The method of claim 2, wherein assembling the sandwich structure comprises forming a plurality of butt joints between the ceramic strips and each of the first panel and the second panel.

4. The method of claim 3, wherein at least one of the plurality of z-fibers physically contacts each of the first panel and the second panel, extending entirely through the thickness of the sandwich structure in a serpentine pattern.

5. The method of claim 3, wherein at least one of the plurality of z-fibers physically contacts the first panel and at least one strip of the ceramic core, extending partially through the thickness of the sandwich structure in a serpentine pattern.

6. The method of claim 5, wherein a second one of the plurality of z-fibers physically contacts each of the first panel and the second panel, extending entirely through the thickness of the sandwich structure in a serpentine pattern.

7. The method of claim 6, wherein the second one of the plurality of z-fibers extends through a subset of the voids of the ceramic core.

8. The method of claim 1, wherein each of the first panel and the second panel comprises silicon carbide.

9. The method of claim 1, wherein each of the plurality of z-fibers comprises silicon carbide.

10. A method of forming a ceramic matrix composite, the method comprising: densifying the sandwich structure of claim 1 with a ceramic matrix using at least one of chemical vapor infiltration, polymer infiltration and pyrolysis, and melt infiltration.

11. A ceramic matrix composite comprising:
   a reinforced sandwich structure comprising:
      a first panel;
      a second panel;
      a ceramic core disposed between and in physical contact with the first panel and the second panel, the ceramic core comprising:
         a plurality of voids extending entirely through the ceramic core from the first panel to the second panel; and
      a plurality of z-fibers woven at least partially through a thickness of the sandwich structure; and
      a ceramic matrix enveloping the reinforced sandwich structure, and
      wherein at least a first z-fiber of the plurality of z-fibers physically contacts each of the first panel and the second panel, extending entirely through the thickness of the sandwich structure and at least one of the plurality of voids.

12. The ceramic matrix composite of claim 11, wherein the ceramic matrix comprises silicon carbide.

13. The ceramic matrix composite of claim 11, wherein each of the first panel and the second panel comprises silicon carbide.

14. The ceramic matrix composite of claim 11, wherein the ceramic core has a grid pattern with a plurality of ceramic strips defining the plurality of voids.

15. The ceramic matrix composite of claim 14, wherein the plurality of ceramic strips form a plurality of butt joints with each of the first panel and the second panel.

16. The ceramic matrix composite of claim 14, wherein the at least the first z-fiber extends in a serpentine manner along two orthogonal axes of the sandwich structure.

17. The ceramic matrix composite of claim 14, wherein a second z-fiber of the plurality of z-fibers physically contacts the first panel and at least one of the plurality of ceramic strips of the ceramic core, extending partially through the thickness of the sandwich structure.

18. The ceramic matrix composite of claim 17, wherein the first and second z-fibers each extend in a serpentine manner along two orthogonal axes of the sandwich structure.

* * * * *